(12) United States Patent
Meshii et al.

(10) Patent No.: US 7,799,595 B2
(45) Date of Patent: Sep. 21, 2010

(54) SEMICONDUCTOR PHYSICAL QUANTITY SENSOR OF ELECTROSTATIC CAPACITANCE TYPE AND METHOD FOR MANUFACTURING THE SAME

(75) Inventors: Ryosuke Meshii, Mishima-gun (JP); Kouji Sakai, Takarazuka (JP); Atsushi Ishigami, Hirakata (JP); Eiichi Furukubo, Kodama (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 125 days.

(21) Appl. No.: 10/599,396

(22) PCT Filed: Dec. 12, 2005

(86) PCT No.: PCT/JP2005/022747

§ 371 (c)(1),
(2), (4) Date: Sep. 27, 2006

(87) PCT Pub. No.: WO2006/075469

PCT Pub. Date: Jul. 20, 2006

(65) Prior Publication Data

US 2007/0176249 A1    Aug. 2, 2007

(30) Foreign Application Priority Data

Jan. 14, 2005    (JP) .............................. 2005-007784

(51) Int. Cl.
H01L 21/00    (2006.01)
H01L 21/76    (2006.01)

(52) U.S. Cl. .......................... 438/50; 438/53; 257/415; 257/419; 257/E23.02

(58) Field of Classification Search .................... 438/50, 438/53; 257/E23.02, 415, 419
See application file for complete search history.

(56) References Cited

U.S. PATENT DOCUMENTS 5,388,460 A * 2/1995 Sakurai et al. ........... 73/514.32

5,977,563 A * 11/1999 Kubo et al. ................... 257/72
2001/0045996 A1* 11/2001 Kawai et al. .................. 349/40

(Continued)

FOREIGN PATENT DOCUMENTS

| JP | 6-340452 | 12/1994 |
| JP | 9-196700 | 7/1997 |
| JP | 10-90300 | 4/1998 |
| JP | 10-178181 | 6/1998 |

OTHER PUBLICATIONS

Machine English Translation of JP Hei 9-196700 (Applicant's admitted prior art).*

(Continued)

*Primary Examiner*—Ha Tran T Nguyen
*Assistant Examiner*—Karen M Kusumakar
(74) *Attorney, Agent, or Firm*—Greenblum & Bernstein, P.L.C.

(57) ABSTRACT

In a semiconductor physical quantity sensor of electrostatic capacitance type, mutually facing peripheral areas (bonding areas) of a glass substrate and a silicon substrate are contacted for anodic bonding, while at the same time, both substrates have an anodic bonding voltage applied therebetween so as to be integrated. A fixed electrode is formed on a bonding face-side surface of the silicon substrate, while a movable electrode is formed on a bonding face-side surface of the semiconductor substrate. An equipotential wiring, which short-circuits the fixed electrode to the movable electrode as a countermeasure to discharge in anodic bonding, is formed on the bonding face-side surface of the glass substrate inside the bonding area before the anodic bonding. After the anodic bonding, the equipotential wiring is cut and removed. By manufacturing the sensor in this manner, the fixed electrode of the insulating substrate is made equipotential to the movable electrode of the semiconductor substrate when the insulating substrate is anodically bonded to the semiconductor substrate, thereby preventing discharge from occurring. Accordingly, it is possible to obtain a high bonding strength and desired sensor characteristics without causing bonding voids to occur and a sensor chip to increase in size.

5 Claims, 10 Drawing Sheets

U.S. PATENT DOCUMENTS

2005/0000561 A1* 1/2005 Baret et al. ................ 136/244
2005/0063125 A1* 3/2005 Kato ......................... 361/113

OTHER PUBLICATIONS

English Language Abstract of JP 9-196700.

English Language Abstract of JP 10-178181.
English Language Abstract of JP 10-090300.
English Language Abstract of JP 6-340452.

* cited by examiner

SEMICONDUCTOR PHYSICAL QUANTITY SENSOR OF ELECTROSTATIC CAPACITANCE TYPE AND METHOD FOR MANUFACTURING THE SAME

TECHNICAL FIELD

The present invention relates to a semiconductor physical quantity sensor of electrostatic capacitance type as a MEMS (Micro Electro Mechanical System) device and a method for manufacturing the same, and more particularly to a countermeasure to discharge in anodic bonding.

BACKGROUND ART

An example of a conventional semiconductor physical quantity sensor of electrostatic capacitance type is shown in FIG. 8. As shown therein, an insulating glass substrate 2 is placed on an upper surface of a silicon semiconductor substrate 1 (hereafter referred to as silicon substrate), in which both substrates 1, 2 are bonded at peripheral areas thereof (joining areas) 5 by anodic bonding. The silicon substrate 1 is etched to form a frame-shaped support mounting 3 having a pressure-sensing portion 4 thin-walled relative thereto to be flexible and movable up and down. Each of the upper and lower surfaces of the pressure-sensing portion 4 serves as a movable electrode, while the glass substrate 2 above has a fixed electrode 7 formed on an inner surface thereof and facing the movable electrode. Now, an electrostatic capacitance is generated between the movable electrode and the fixed electrode according to a gap 6. The pressure-sensing portion 4 moves with a pressure applied thereto, thereby changing the gap 6, so that the electrostatic capacitance generated between both electrodes also changes. The change of the gap, namely pressure, is designed to be obtained by detecting the change of the electrostatic capacitance.

A signal is output to an external circuit via through-holes 8a, 8b formed in the glass substrate 2 from a conductive film 9a electrically connected to the silicon substrate 1 or movable electrode, and from a conductive film 9b which is electrically connected to the fixed electrode 7 through its lead portions 7c and insulated from the silicon substrate 1 by an insulating film 10. Note that reference numeral 11 designates a power supply for bonding the silicon substrate 1 to the glass substrate 2 by anodic bonding. The anodic bonding between the silicon substrate 1 and glass substrate 2 at the time of applying a high voltage for the bonding may cause a risk that the movable pressure-sensing portion 4 is moved by electrostatic attraction to get closer to the fixed electrode 7 formed on the glass substrate 2, generating discharge A therebetween, so that the fixed electrode 7 is alloyed by heat and thereby fusion-bonded to the pressure-sensing portion 4. The occurrence of such state leads to a problem that the pressure-sensing portion 4 becomes unmovable and unable to detect a pressure.

In order to solve this problem, it is known, as shown in FIG. 9 and FIG. 10, that on a glass substrate 2 in a sensor equivalent to the one described above, a short-circuit conductive pattern (equipotential wiring) 70 to electrically connect a fixed electrode 7 of the glass substrate 2 to a movable electrode of a silicon substrate 1 is formed in advance, and that when a high voltage is applied for anodic bonding, both electrodes are electrically connected via the equipotential wiring 70. This makes the fixed electrode equipotential to the silicon substrate in anodic bonding. Accordingly, discharge does not occur in anodic bonding, so that both electrodes are prevented from contacting and being fusion-bonded to each other, making it possible to obtain a high bonding strength as well.

However, with the equipotential wiring being kept formed, desired sensor characteristics cannot be obtained.

Thus, it is known to form a short-circuit conductive pattern having a gap which electrically connects the fixed electrode to the silicon substrate via short-circuit conductive pattern in anodic bonding, and which electrically disconnects the fixed electrode from the silicon substrate in normal measurement of a physical quantity (refer e.g. to Japanese Laid-open Patent Publication Hei 9-196700). However, this short-circuit conductive pattern is formed between the glass substrate and the silicon substrate, which leads to a problem that bonding voids (condition like trapping bubbles preventing bonding) are likely to occur around the short-circuit conductive pattern.

It is also proposed to provide a short-circuit conductive pattern on a silicon substrate outside a bonding portion between a silicon substrate and a glass substrate, and to cut this short-circuit conductive pattern e.g. using a laser after anodic bonding (refer e.g. to Japanese Laid-open Patent Publication Hei 6-340452). However, in this case, a problem arises in that a chip size increases because the short-circuit conductive pattern is provided outside the bonding portion between both substrates.

DISCLOSURE OF INVENTION

The present invention is to solve the above-described problems, and the object is to provide a semiconductor physical quantity sensor of electrostatic capacitance type and a method for manufacturing the same that make a fixed electrode of an insulating substrate equipotential to a movable electrode of a semiconductor substrate when the insulating substrate is anodically bonded to the semiconductor substrate, so as to prevent discharge from occurring, and that make it possible to obtain a high bonding strength and desired sensor characteristics without causing bonding voids to occur and a sensor chip to increase in size.

To solve the above problem, the present invention provides a method for manufacturing a semiconductor physical quantity sensor of electrostatic capacitance type, in which mutually facing peripheral areas (referred to as bonding areas) of an insulating substrate and a semiconductor substrate are contacted for anodic bonding, while both substrates have an anodic bonding voltage applied therebetween so as to be integrated by anodic bonding, with a fixed electrode being formed on a bonding face-side surface of the insulating substrate, and with a movable electrode being formed on a bonding face-side surface of the semiconductor substrate, the method comprising: a first step of forming, before the anodic bonding, an equipotential wiring to short-circuit the fixed electrode to the movable electrode on the bonding face-side surface of the insulating substrate inside the bonding area; a second step of performing the anodic bonding; and a third step of cutting and removing the equipotential wiring after the anodic bonding.

In the third step, the equipotential wiring can be cut by laser irradiation allowed to pass through from the insulating substrate.

In the third step, a voltage can be applied between conductive film layers exposed at bottom portions of respective through-holes which are provided in the insulating substrate for the fixed electrode and the movable electrode so as to cause a current to flow in the equipotential wiring, and the equipotential wiring is cut by heat generated based thereon.

Further, the present invention provides a method for manufacturing a semiconductor physical quantity sensor of electrostatic capacitance type, in which mutually facing peripheral areas (referred to as bonding areas) of an insulating substrate and a semiconductor substrate are contacted for anodic bonding, while both substrates have an anodic bonding voltage applied therebetween so as to be integrated by anodic bonding, with a fixed electrode being formed on a bonding face-side surface of the insulating substrate, and with a movable electrode being formed on a bonding face-side surface of the semiconductor substrate, the method comprising: a first step of forming, before the anodic bonding, an equipotential wiring to short-circuit the fixed electrode to the movable electrode on the bonding face-side surface of the semiconductor substrate inside the bonding area; a second step of performing the anodic bonding; and a third step of cutting and removing the equipotential wiring after the anodic bonding.

In the third step, various methods as described above can similarly be applied to cut the equipotential wiring.

Preferably, in either of the above, the equipotential wiring has a reduced wiring width at a cutting location thereof. This leads to that when a current is caused to flow for cutting, the current and voltage are concentrated on the reduced-width portion, making it possible to easily achieve the cutting of the equipotential wiring.

The present invention provides a semiconductor physical quantity sensor of electrostatic capacitance type, in which mutually facing peripheral areas (referred to as bonding areas) of an insulating substrate and a semiconductor substrate are contacted for anodic bonding, while both substrates have an anodic bonding voltage applied therebetween so as to be integrated by anodic bonding, with a fixed electrode being formed on a bonding face-side surface of the insulating substrate, and with a movable electrode being formed on a bonding face-side surface of the semiconductor substrate, wherein: an equipotential wiring to short-circuit the fixed electrode to the movable electrode is formed on the bonding face-side surface of the insulating substrate or the semiconductor substrate inside the bonding area; and the equipotential wiring has such a structure that can be cut by applying a laser irradiation or a current to the equipotential wiring after the anodic bonding.

According to the present invention, in anodic bonding, the semiconductor substrate (movable electrode) is connected to the fixed electrode by an equipotential wiring, which is a short-circuit conductive pattern, so that the movable electrode is equipotential to the fixed electrode. This prevents discharge from occurring between both electrodes in the anodic bonding, whereby the anodic bonding is secured. This equipotential wiring is cut and removed after the end of the bonding. This electrically separates the movable electrode from the fixed electrode, making it possible to detect a physical quantity such as pressure, acceleration or the like, whereby a sensor having desired characteristics can be obtained. Furthermore, since the equipotential wiring is prevented from being sandwiched between the substrates, bonding voids are prevented from occurring. Further, since the short-circuit conductive pattern is formed on the insulating substrate inside the bonding portion, it is possible to reduce chip size.

BEST MODE FOR CARRYING OUT THE INVENTION

Figure 1:
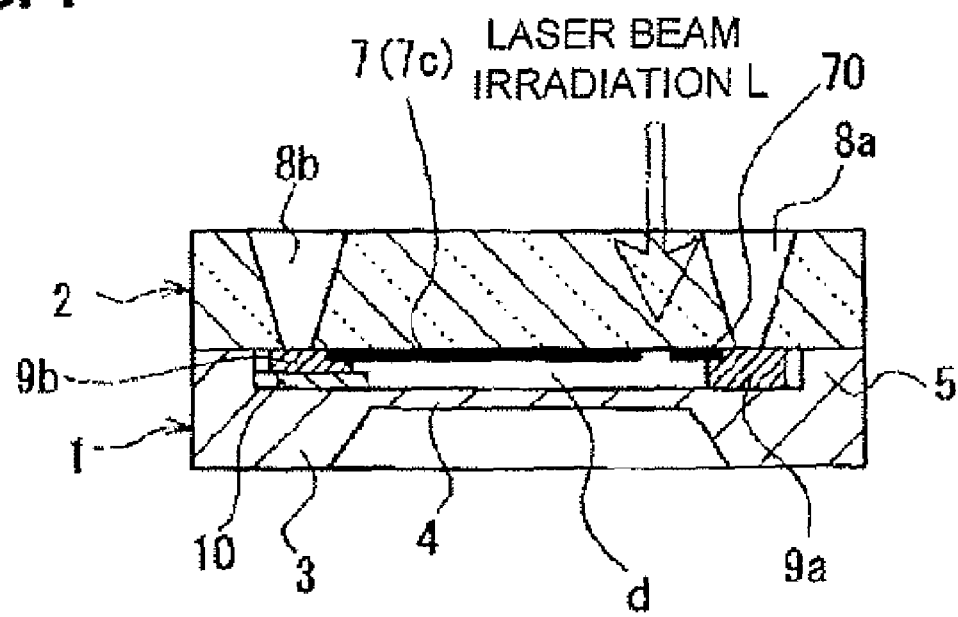
FIG. 1 is a cross-sectional view of a pressure sensor of electrostatic capacitance type according to an embodiment of the present invention, showing to cut an equipotential wiring by laser beam irradiation.
Figure 2:
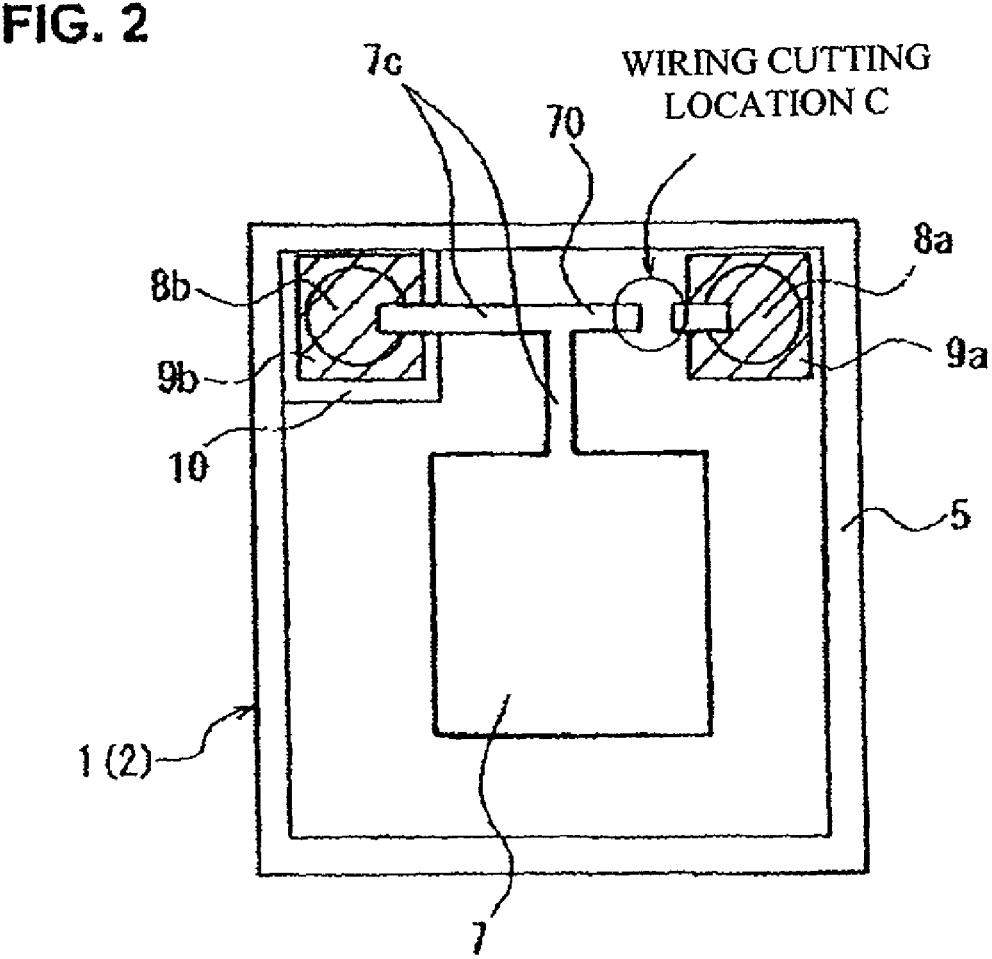
FIG. 2 is a top plan of the sensor.

Hereinafter, a semiconductor physical quantity sensor of electrostatic capacitance type (hereafter referred to as capacitance type sensor) according to an embodiment of the present invention will be described with reference to the drawings. FIG. 1 shows a cross-sectional structure of a capacitance type sensor according to an embodiment of the present invention, while FIG. 2 is a top plan structure of the sensor, in which a glass substrate 2 is transparent, and a fixed electrode 7 and so on are shown in a see-through manner. The drawings show a silicon substrate 1 (semiconductor substrate) as a wafer corresponding to one sensor chip part together with the glass substrate 2 (insulating substrate), while in an actual manufacturing process, areas corresponding to the glass substrate 2 are allocated on the surface of a large glass substrate. This similarly applies to the silicon substrate 1.

Before anodic bonding to bond both substrates, the fixed electrode 7 and lead portions 7c having a predetermined pattern shape are formed at the same time by evaporation or sputtering on the bonding face-side surface of the glass substrate 2. When this fixed electrode 7 is formed, an equipotential wiring 70 is formed at the same time which is led from the fixed electrode 7 and is a short-circuit conductive pattern to short-circuit the fixed electrode 7 and a movable electrode (first step). The equipotential wiring 70 is formed inside the bonding area, namely in the fixed electrode 7 of the glass substrate 2. The equipotential wiring 70 can be formed by only changing the pattern shape of evaporating/sputtering a given metal on the surface of the glass substrate 2. Meanwhile, a support mounting 3 and a pressure-sensing portion 4 are formed on the silicon substrate 1 by etching. The bonding face-side surface of the silicon substrate 1 including the pressure-sensing portion 4 serves as a movable electrode.

Such silicon substrate 1 and glass substrate 2 are contacted with their relative positions being aligned together. Here, mutually facing peripheral areas (referred to as bonding areas) 5 of the silicon substrate 1 and glass substrate 2 are contacted for anodic bonding, and both substrates have an anodic bonding voltage applied therebetween so as to be integrated by anodic bonding (second step) as will be described in detail later. The equipotential wiring 70 is cut and removed after the anodic bonding as shown by a wiring cutting location C (third step). The equipotential wiring 70 serves to electrically connect the fixed electrode 7 of the glass substrate 2 to the movable electrode of the silicon substrate 1, and is used as a countermeasure to discharge in anodic bonding.

Two through-holes 8a, 8b for the movable electrode and the fixed electrode are formed at predetermined positions in, and penetrate up and down through, the glass substrate 2. The silicon substrate 1 has formed thereon a conductive film 9a electrically connected to the movable electrode so as to be exposed to the bottom portion of the through-hole 8a, and also has formed thereon a conductive film 95 electrically connected to the fixed electrode 7 through its lead portions 7c so as to be exposed to the bottom portion of the through-hole 8b. This conductive film 9b is formed on an insulating film 10 for insulation from the silicon substrate 1. A sensor signal is output from the conductive films 9a, 9b to an external circuit via the through-holes 8a, 8b. The through-holes each have an inner wall surface with a conductive film formed thereon, and are respectively electrically connected to conductive thin films formed mutually separately on the surface of the glass substrate 2.

This kind of pressure sensor of electrostatic capacitance type changes a capacitance gap 6 with a pressure applied to the pressure-sensing portion 4. Assuming that this gap length is d, and that the area of the fixed electrode 7 is S, a capacitance C between both electrodes is to output a change according to $C=\epsilon_0 S/d$.

Next, anodic bonding between the silicon substrate 1 and glass substrate 2 of the capacitance type sensor will be described in detail. For anodic bonding, an anode of a power supply for anodic bonding is connected to the silicon substrate 1, and further a cathode of the power supply for anodic bonding is connected to the glass substrate 2, so as to apply a predetermined voltage between both electrodes. Thereby, a current is caused to flow between the silicon substrate 1 and glass substrate 2, contact portions of both of which, namely the peripheral areas (bonding area) 5 in the present example, are bonded and integrated (anodic bonding). At this time, the fixed electrode 7 and the movable electrode are short-circuited by the equipotential wiring 70 to be equipotential, so that it is unlikely for a potential difference to be generated therebetween. This prevents discharge between the electrodes in the anodic bonding, and thus prevents the electrodes from being alloyed and thereby fusion-bonded together upon the discharge, whereby the anodic bonding is secured.

After the anodic bonding, the equipotential wiring 70 is cut. For this purpose, a laser beam irradiation L (arrow in FIG. 1) is used. A laser beam, using $CO_2$, YAG or the like, is allowed to pass from the glass substrate 2 through the glass, and is irradiated to the wiring cutting location C of the equipotential wiring 70, thereby cutting the equipotential wiring 70. In this way, a sensor having desired characteristics can be obtained.

Figure 3:
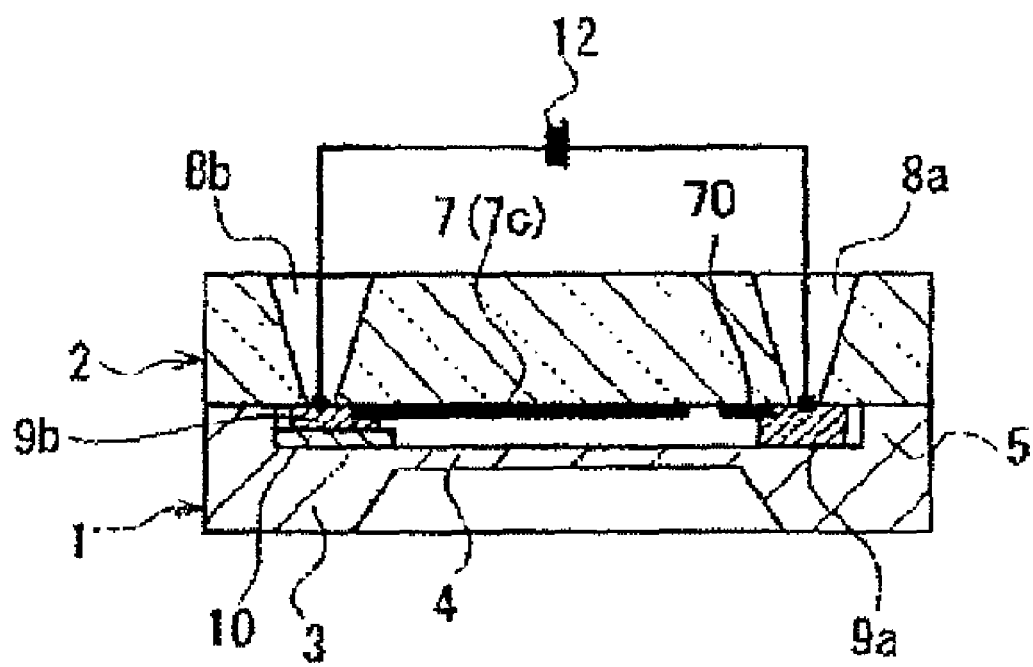
FIG. 3 is a cross-sectional view of the sensor, showing to cut the equipotential wiring by voltage application.

Next, another method of removing the equipotential wiring 70 following the anodic bonding in the capacitance type sensor will be described. As shown in FIG. 3, a DC bias power supply 12 is connected so as to cause a current to flow in the equipotential wiring 70, and the current flow based on this voltage application causes the equipotential wiring 70 to generate heat so as to be melted and cut. The voltage is applied between the conductive films 9a, 9b exposed at the bottom portions of the respective through-holes 8a, 8b which are provided in the glass substrate 2 for the movable electrode and the fixed electrode. The applied voltage had better be gradually increased to increase the probability of cutting at a constant location.

Figure 4:
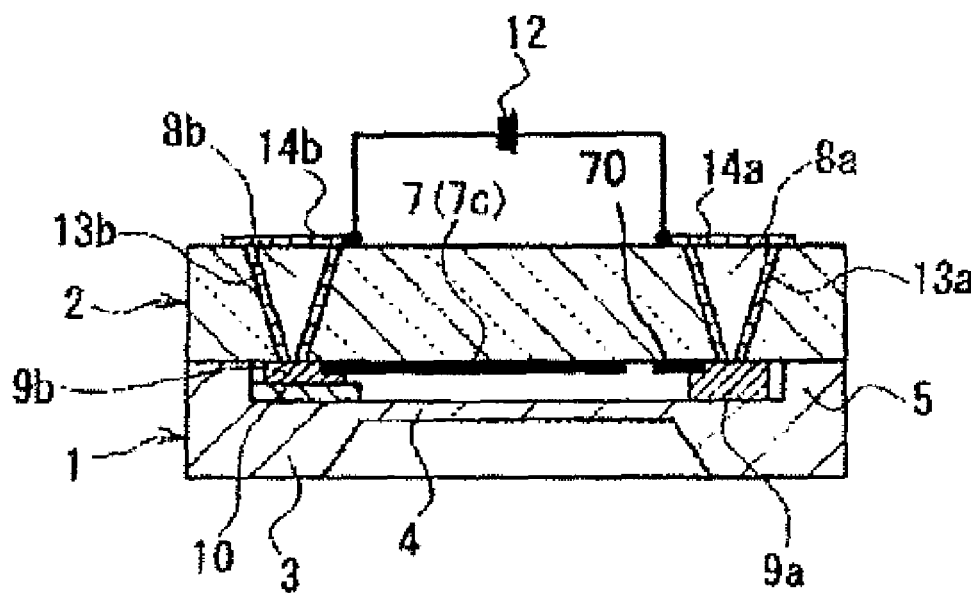
FIG. 4 is a cross-sectional view of the sensor, showing to cut the equipotential wiring by voltage application using through-holes.

In the method of removing the equipotential wiring 70 by the above-described voltage application, it is also possible, as shown in FIG. 4, to use the through-holes 8a, 8b of the glass substrate 2 as voltage application terminals. Conductive films 13a, 13b are formed on inner wall surfaces of the through-holes 8a, 8b, while conductive film portions 14a, 14b which are electrically connected to the conductive films 9a, 9b on the silicon substrate 1 via the conductive films 13a, 13b are formed on the glass substrate 2, allowing the conductive film portions 14a, 14b to serve as the voltage application terminals. The step of forming the conductive layers 13a, 13b on the inner wall surfaces of the through-holes can be performed either before or after the anodic bonding.

Figure 5:
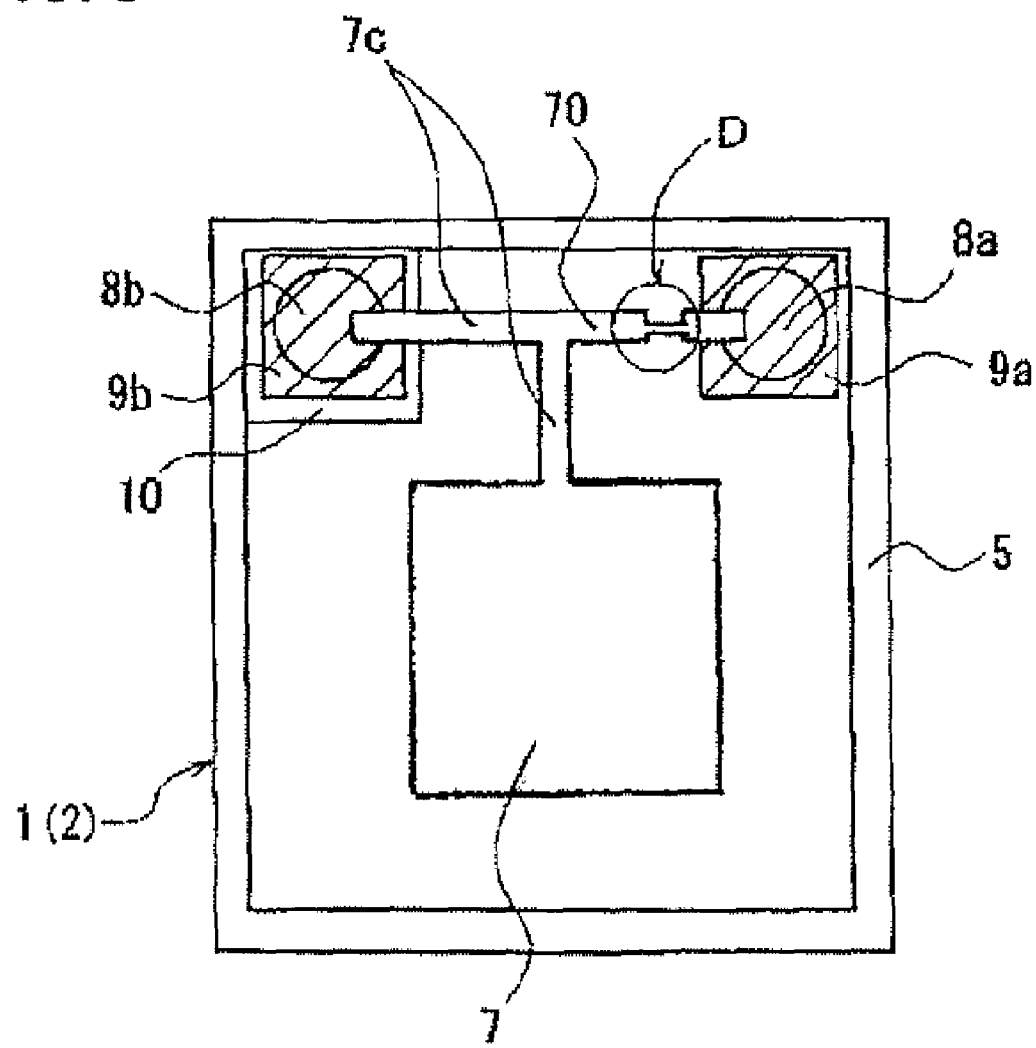
FIG. 5 is a top plan view of the sensor, showing to reduce a wiring width of the equipotential wiring.

In either the process of cutting the equipotential wiring 70 using the laser beam irradiation or the process of cutting the equipotential wiring 70 using the voltage application as described above, it is preferable to form, as shown in FIG. 5, a reduced-width portion D of the equipotential wiring 70 which is around the wiring cutting location and which is reduced in the width of the wiring pattern. The reduced-width portion D, which is thus partially present in the equipotential wiring 70, facilitates recognizing the target location of a laser beam spot for cutting in the case of the cutting process using a laser, and increases the electrical resistance at the portion of the reduced wiring width in the case of the cutting process using voltage application, thereby making it possible to stabilize the cutting location.

Figure 6:
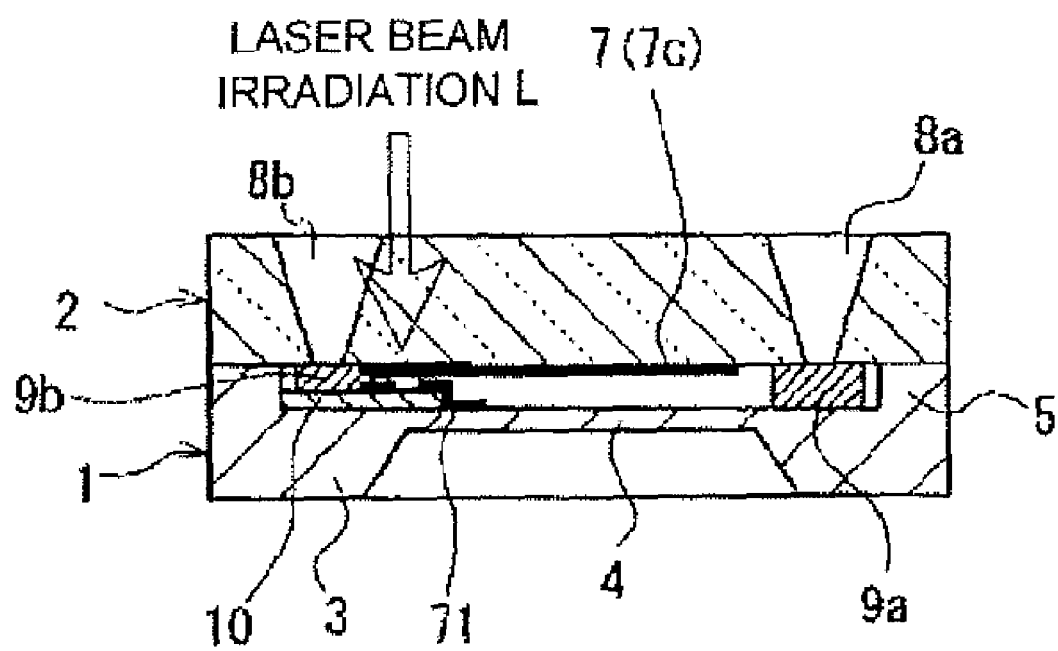
FIG. 6 is a cross-sectional view of a pressure sensor of electrostatic capacitance type according to another embodiment of the present invention, showing to cut an equipotential wiring by laser beam irradiation.
Figure 7:
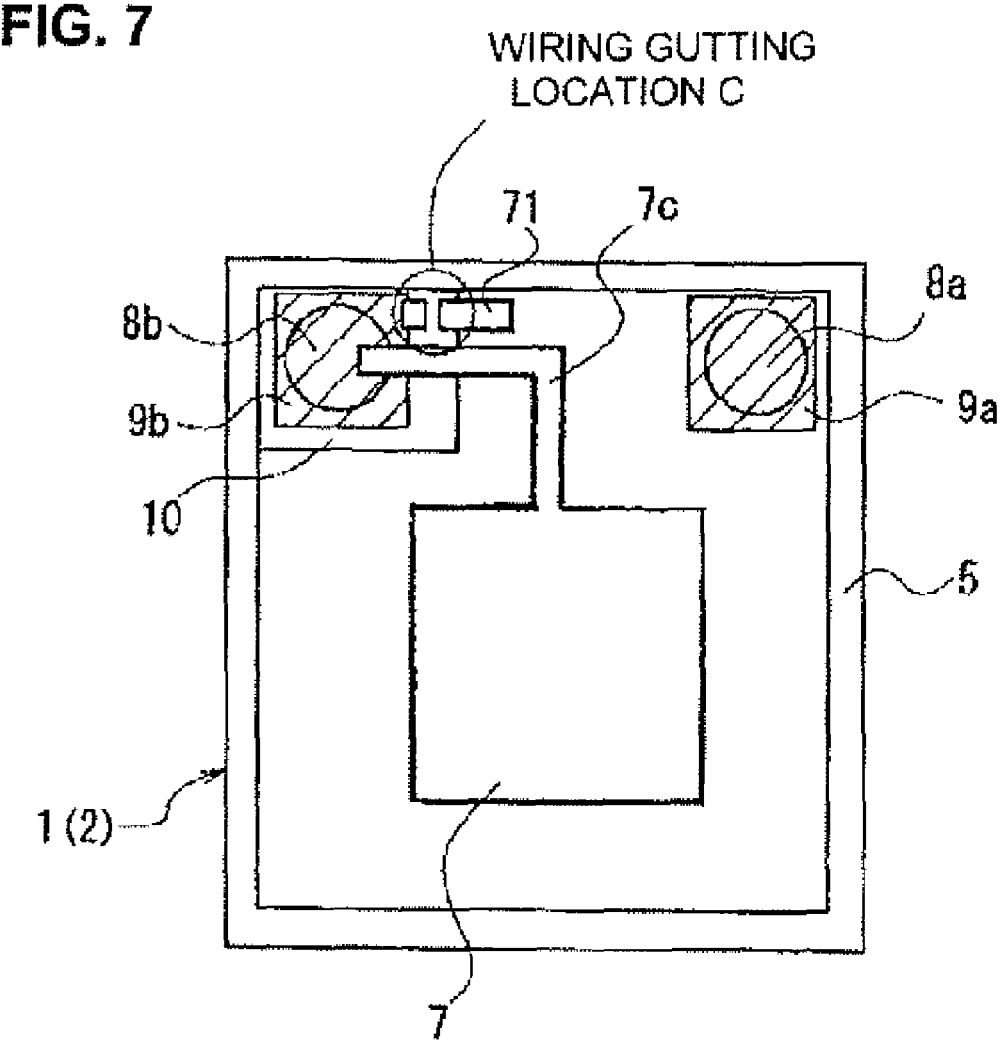
FIG. 7 is a top plan view of the sensor.
Figure 8:
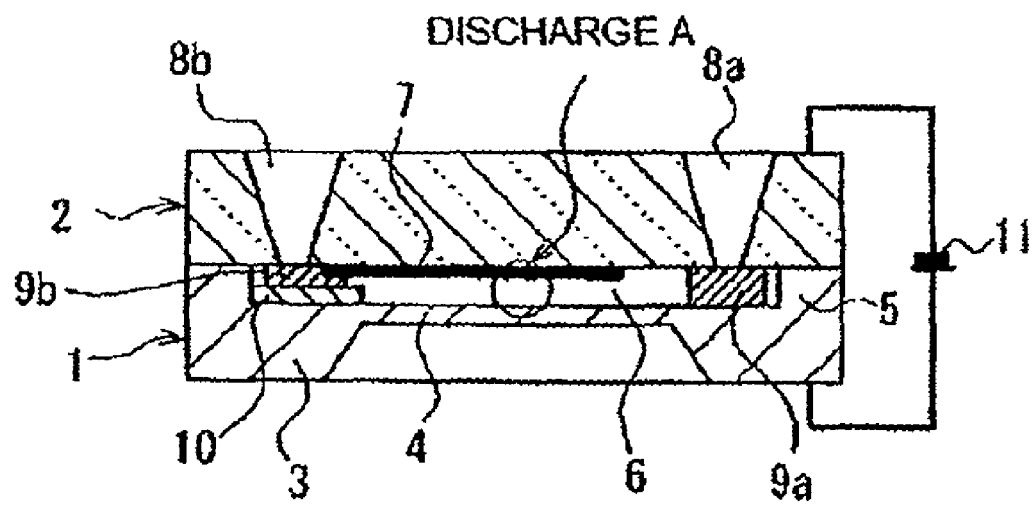
FIG. 8 is a cross-sectional view of a conventional pressure sensor of electrostatic capacitance type having no equipotential wiring.
Figure 9:
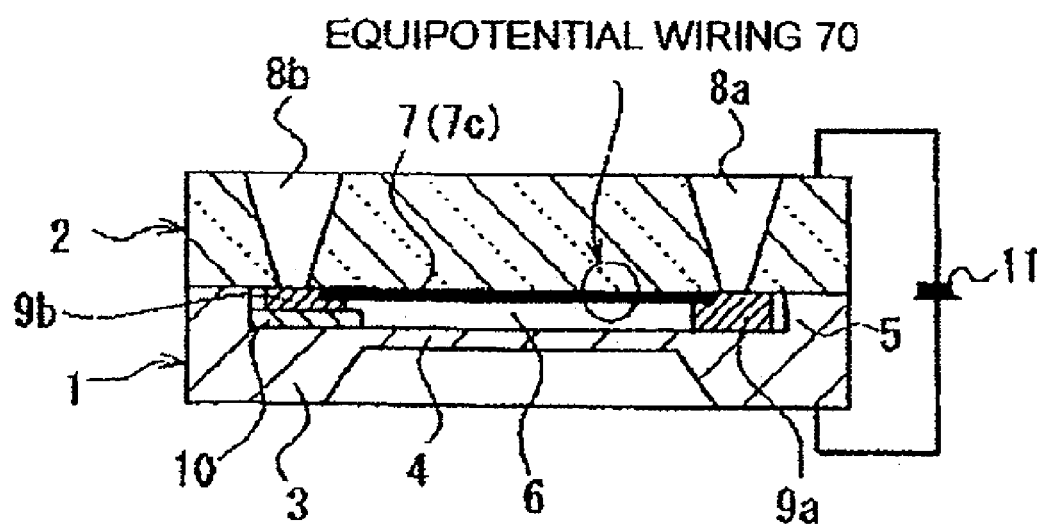
FIG. 9 is a cross-sectional view of a conventional pressure sensor of electrostatic capacitance type having an equipotential wiring.
Figure 10:
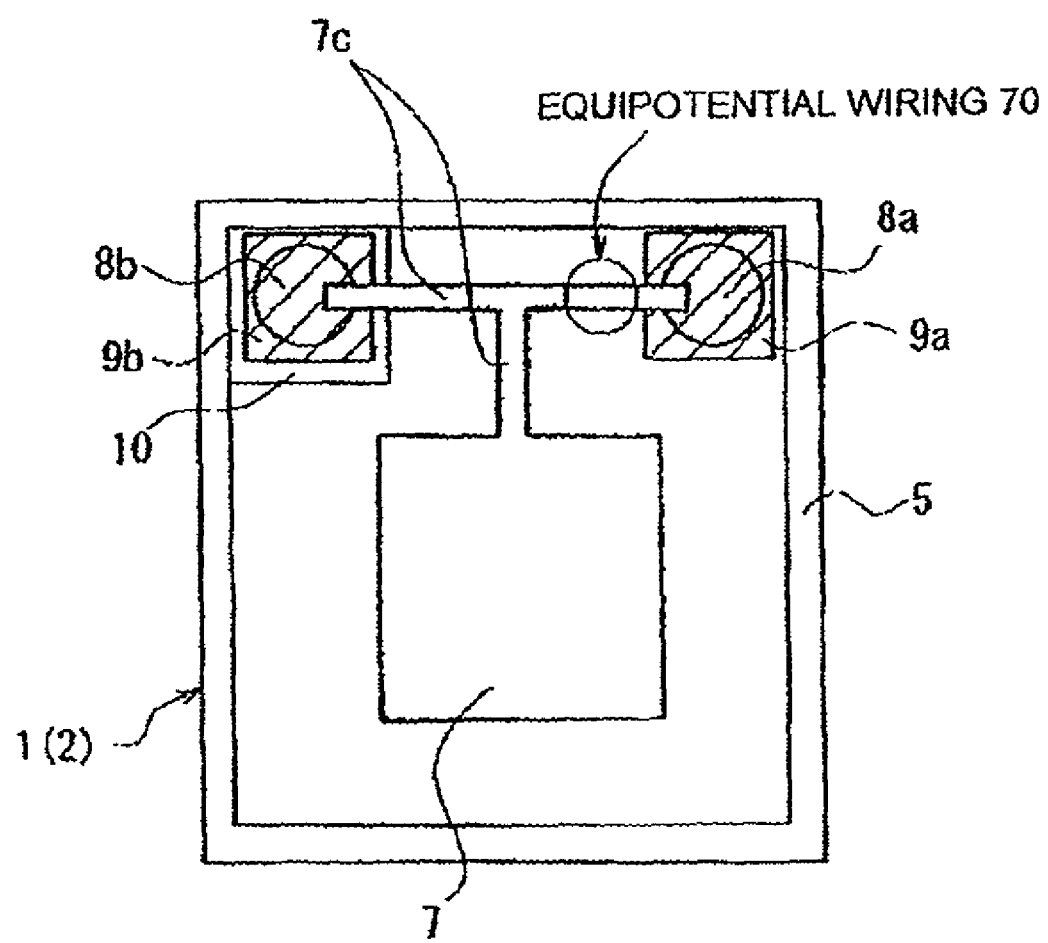
FIG. 10 is a top plan view of the conventional pressure sensor of electrostatic capacitance type having the equipotential wiring.

While the above has shown an embodiment with an equipotential wiring 70 formed on a glass substrate 2 in a capacitance type sensor, a capacitance type sensor of another embodiment with one formed on a silicon substrate 1 will be described hereinafter with reference to FIG. 6 and FIG. 7. An equipotential wiring 71 according to this embodiment is formed on a silicon substrate 1 so as to electrically connect a conductive film 9b for a fixed electrode to a movable electrode of the silicon substrate 1 (first step). This equipotential wiring 71 makes a fixed electrode 7 equipotential to the movable electrode. This prevents discharge between the electrodes in anodic bonding similarly as in the above-described embodiment, whereby secure anodic bonding is performed.

After the anodic bonding (second step), this equipotential wiring 71 is cut. The equipotential wiring 71 is cut by applying a laser beam irradiation L to a wiring cutting location C from a glass substrate 2 through the glass (third step).

Although not shown, the equipotential wiring 71 following the anodic bonding can be cut either by applying a DC voltage to the conductive films for the movable electrode and fixed electrode similarly as in the above FIG. 3, or by using through-holes of the glass substrate 2 similarly as in FIG. 4. Furthermore, similarly as in the above, it is preferable to reduce a wiring width around the wiring cutting location of the equipotential wiring 71.

Although various embodiments of the present invention have been described above, its various modifications are possible without being limited to the structures of the above-described embodiments, such that examples of the MEMS device to be mentioned as an object to which it is to be applied are electrostatic capacitance type pressure sensor, electrostatic capacitance type angular velocity sensor and others such as piezoelectric type pressure/acceleration/angular velocity sensor and MEMS mechanical relay. Furthermore, the glass substrate 2 is only required to be of an insulating substrate material, in which glass and other transparent materials that pass a laser beam can be used therefor. Silicon and others such as GaAs and Ge can be used for the silicon substrate 1. Materials which can be used for the fixed electrode/conductive filter are Cr, Al and others such as Au, Ag, Cu, Pt and Ti.

Further, the present application is based on Japanese Patent Application 2005-007784, the content of such patent application being incorporated into the present application by reference.

The invention claimed is:

1. A method for manufacturing a semiconductor physical quantity sensor of electrostatic capacitance type, in which mutually facing peripheral bonding areas of an insulating substrate and a semiconductor substrate are contacted for anodic bonding, while both substrates have an anodic bonding voltage applied therebetween so as to be integrated by anodic bonding, with a fixed electrode being formed on a bonding face-side surface of the insulating substrate, and with a movable electrode being formed on a bonding face-side surface of the semiconductor substrate, the method comprising:
forming, before the anodic bonding, an equipotential wiring to short-circuit the fixed electrode to the movable electrode on the bonding face-side surface of the insulating substrate inside the bonding area, and to be prevented from being directly sandwiched between the both substrates, in which all of the fixed electrode, the movable electrode, the bonding face-side surfaces of the insulating substrate and the semiconductor substrate, and the equipotential wiring are placed inside the bonding area;
performing the anodic bonding; and
cutting and removing the equipotential wiring after the anodic bonding in which the equipotential wiring is cut by a laser irradiation allowed to pass through from the insulating substrate.

2. The method for manufacturing a semiconductor physical quantity sensor of electrostatic capacitance type according to claim 1, wherein in the forming, the equipotential wiring has a reduced wiring width at a cutting location thereof.

3. A method for manufacturing a semiconductor physical quantity sensor of electrostatic capacitance type, in which mutually facing peripheral bonding areas of an insulating substrate and a semiconductor substrate are contacted for anodic bonding, while both substrates have an anodic bonding voltage applied therebetween so as to be integrated by anodic bonding, with a fixed electrode being formed on a bonding face-side surface of the insulating substrate, and with a movable electrode being formed on a bonding face-side surface of the semiconductor substrate, the method comprising:
forming, before the anodic bonding, an equipotential wiring to short-circuit the fixed electrode to the movable electrode on the bonding face-side surface of the semiconductor substrate inside the bonding area, and to be prevented from being directly sandwiched between the both substrates, in which all of the fixed electrode, the movable electrode, the bonding face-side surfaces of the insulating substrate and the semiconductor substrate, and the equipotential wiring are placed inside the bonding area;
performing the anodic bonding; and
cutting and removing the equipotential wiring after the anodic bonding in which the equipotential wiring is cut by a laser irradiation allowed to pass through from the insulating substrate.

4. The method for manufacturing a semiconductor physical quantity sensor of electrostatic capacitance type according to claim 3, wherein in the forming, the equipotential wiring has a reduced wiring width at a cutting location thereof.

5. A semiconductor physical quantity sensor of electrostatic capacitance type, in which mutually facing peripheral bonding areas of an insulating substrate and a semiconductor substrate are contacted for anodic bonding, while both substrates have an anodic bonding voltage applied therebetween so as to be integrated by anodic bonding, with a fixed electrode being formed on a bonding face-side surface of the insulating substrate, and with a movable electrode being formed on a bonding face-side surface of the semiconductor substrate, wherein:

an equipotential wiring to short-circuit the fixed electrode to the movable electrode is formed on the bonding face-side surface of the insulating substrate or the semiconductor substrate inside the bonding area so as to be prevented from being directly sandwiched between the both substrates, with all of the fixed electrode, the movable electrode, the bonding face-side surfaces of the insulating substrate and the semiconductor substrate, and the equipotential wiring being placed inside the bonding area; and the equipotential wiring has such a structure that can be cut by applying, to the equipotential wiring, a laser irradiation passing through from the insulating substrate after the anodic bonding.

* * * * *